(12) United States Patent
Buol et al.

(10) Patent No.: US 12,057,750 B2
(45) Date of Patent: Aug. 6, 2024

(54) STATOR, CONNECTION COMPONENT, AND ELECTRIC MACHINE

(71) Applicant: JHEECO E-DRIVE AG, Eschen (LI)

(72) Inventors: Roland Buol, Wangs (CH); Martin Stöck, Salez (CH)

(73) Assignee: JHEECO E-DRIVE AG, Eschen (LI)

( * ) Notice: Subject to any disclaimer, the term of this patent is extended or adjusted under 35 U.S.C. 154(b) by 516 days.

(21) Appl. No.: 17/413,423

(22) PCT Filed: Dec. 11, 2019

(86) PCT No.: PCT/EP2019/084727
§ 371 (c)(1),
(2) Date: Jun. 11, 2021

(87) PCT Pub. No.: WO2020/120612
PCT Pub. Date: Jun. 18, 2020

(65) Prior Publication Data
US 2022/0060077 A1 Feb. 24, 2022

(30) Foreign Application Priority Data
Dec. 12, 2018 (DE) ..................... 10 2018 131 965.7

(51) Int. Cl.
*H02K 3/50* (2006.01)
*H02K 3/24* (2006.01)
(Continued)

(52) U.S. Cl.
CPC ................ *H02K 3/50* (2013.01); *H02K 3/24* (2013.01); *H02K 3/28* (2013.01); *H02K 5/203* (2021.01);
(Continued)

(58) Field of Classification Search
CPC ............... H02K 3/50; H02K 3/24; H02K 3/28
See application file for complete search history.

(56) References Cited

U.S. PATENT DOCUMENTS 4,115,915 A * 9/1978 Godfrey ................. H02K 3/505
310/71
2013/0200743 A1 8/2013 Okimitsu
(Continued)

FOREIGN PATENT DOCUMENTS

DE 102016221043 A1 * 4/2018
DE 102016221043 A1 4/2018
(Continued)

OTHER PUBLICATIONS

DE-102016221043-A1_translate (Year: 2018).*
International Search Report of PCT/EP2019/084727 dated Mar. 30, 2020.

*Primary Examiner* — Tulsidas C Patel
*Assistant Examiner* — Mohammed Ahmed Qureshi
(74) *Attorney, Agent, or Firm* — Calfee, Halter & Griswold LLP

(57) ABSTRACT

The invention relates to a stator for an electric machine, comprising a plurality of rod conductors and a plurality of interconnection pieces. The interconnection pieces each have a curved shape, in particular the shape of a C, extending in the radial direction and about the axis of rotation of the stator; in order to form respective interconnection planes along the axis of rotation, each group of interconnection pieces is arranged in the region of at least one short end of the rod conductors of the associated group of rod conductors that are to be electrically connected. The invention further relates to a connection component and an electric machine.

16 Claims, 8 Drawing Sheets

Figure 1:
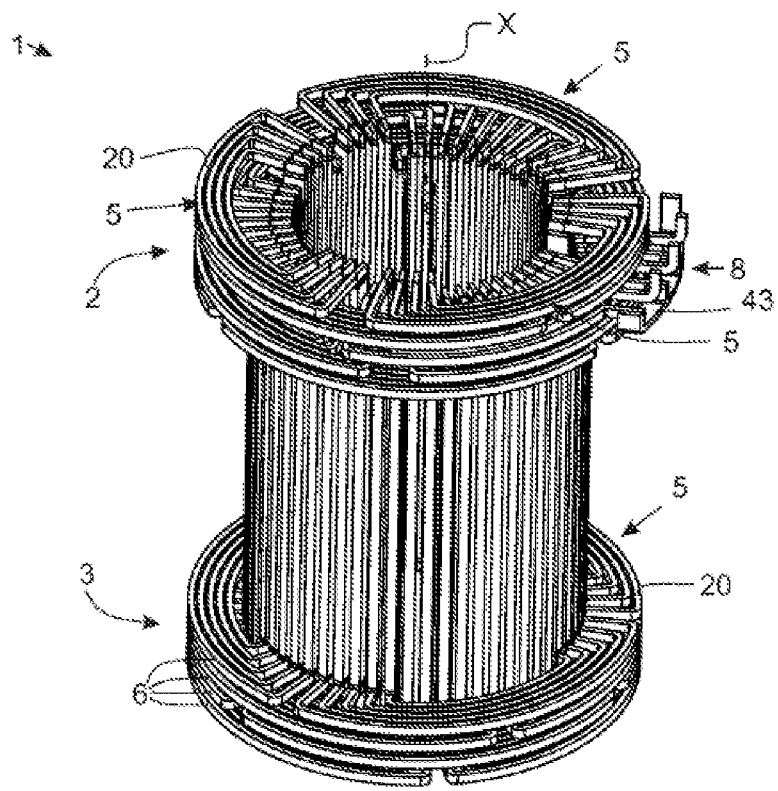

(51) Int. Cl.
*H02K 3/28* (2006.01)
*H02K 5/20* (2006.01)
*H02K 15/04* (2006.01)
*H02K 15/06* (2006.01)
*H02K 15/085* (2006.01)

(52) U.S. Cl.
CPC ....... *H02K 15/0414* (2013.01); *H02K 15/064* (2013.01); *H02K 15/085* (2013.01)

(56) References Cited

U.S. PATENT DOCUMENTS

| | | | |
|---|---|---|---|
| 2014/0306561 A1* | 10/2014 | Egami | H02K 3/12 310/71 |
| 2018/0166931 A1* | 6/2018 | Takahashi | H02K 15/085 |
| 2018/0233984 A1* | 8/2018 | Ogawa | H02K 5/1732 |

FOREIGN PATENT DOCUMENTS

| | | |
|---|---|---|
| DE | 112016003666 T5 | 5/2018 |
| EP | 2112747 A1 | 10/2009 |
| WO | 2005004308 A1 | 1/2005 |

\* cited by examiner

| Width interconnection piece [mm] | Height interconnection piece [mm] | Cross-section interconnection piece [mm] | Stator losses 20 °C [W] | Stator losses 155 °C [W] |
|---|---|---|---|---|
| 3 | 1 | 3 | 1491 | 2166 |
| 3 | 1,3 | 3,9 | 1222 | 1783 |
| 3 | 1,7 | 5,1 | 1013 | 1484 |
| 3 | 2 | 6 | 913 | 1341 |
| 3 | 2,3 | 6,9 | 839 | 1237 |
| 3 | 2,7 | 8,1 | 769 | 1137 |
| 3 | 3 | 9 | 729 | 1080 |
| 3 | 3,3 | 9,9 | 697 | 1036 |
| 3 | 3,7 | 11,1 | 664 | 989 |
| 3 | 4 | 12 | 644 | 961 |
| 3 | 4,3 | 12,9 | 628 | 938 |
| 3 | 4,7 | 14,1 | 611 | 914 |
| 3 | 5 | 15 | 599 | 898 |
| 3 | 5,3 | 15,9 | 591 | 888 |
| 3 | 5,7 | 17,1 | 580 | 872 |
| 3 | 6 | 18 | 574 | 864 |
| 3 | 6,3 | 18,9 | 569 | 857 |
| 3 | 6,7 | 20,1 | 563 | 850 |
| 3 | 7 | 21 | 560 | 846 |
| 3 | 7,3 | 21,9 | 557 | 842 |
| 3 | 7,7 | 23,1 | 554 | 839 |
| 3 | 8 | 24 | 553 | 838 |
| 3 | 9 | 27 | 551 | 836 |
| 3 | 10 | 30 | 552 | 839 |
| 3 | 11 | 33 | 556 | 846 |
| 3 | 12 | 36 | 561 | 856 |
| 3 | 14 | 42 | 575 | 880 |
| 3 | 16 | 48 | 594 | 909 |
| 3 | 20 | 60 | 636 | 976 |

Fig. 13

STATOR, CONNECTION COMPONENT, AND ELECTRIC MACHINE

CROSS-REFERENCE TO RELATED APPLICATIONS

The present application is the national stage of PCT Application No. PCT/EP2019/084727, filed on Dec. 11, 2019, which claims priority to the German patent application No. 102018131965.7, filed on Dec. 12, 2018, which are incorporated herein by reference in their entireties.

The invention relates to a stator for an electric machine. Furthermore, the invention relates to a connection component and an electric machine.

Assembled windings are windings composed of segmental conductors, also referred to as rod conductors. The segmental conductors are connected to half windings directly by bending them towards each other, or indirectly via interconnection pieces.

From prior art, it is known to connect segmental conductors to half windings via separate copper connectors or interconnection pieces. The exact positioning of the interconnection pieces and the rod conductors opposite each other for subsequent electric contacting or connection is difficult. In citation U.S. Pat. No. 9,118,224 B2, the relative positioning and electric contacting is solved by screw or pin elements. For this, the interconnection pieces must be placed on individually. Thus, however, assembly is very cumbersome.

As an alternative, it is known to connect the segmental conductors to each other directly, i. e. without the insertion of interconnection pieces. To this end, the segmental conductors are made to abut against each other by means of positioning tools and directly welded to each other. Citation DE 11 2015 001 994 A5, for example, shows a winding overhang for compression moulded wire strands or compressed strands, wherein the compressed strands are bent towards each other to connect them and welded to each other. However, the resulting winding overhang has a large structural height.

It is the object of the invention to provide a stator permitting an interconnection of rod conductors in a simplified and inexpensive manner for providing assembled windings, providing an optimized process reliability for a secure electrical connection and having a reduced installation space. Moreover, it is the object of the invention to provide a connection component and an electric machine.

This object is achieved with respect to the stator by claim 1, with respect to the connection component by claim 11, and with respect to the electric machine by claim 12.

According to the present invention, a stator for an electric machine comprising a plurality of rod conductors is provided which are arranged radially distributed about an axis of rotation of the stator and are each arranged spaced apart from each other, so that the rod conductors extend in the longitudinal direction of the axis of rotation, and with a plurality of interconnection pieces, wherein one interconnection piece each is associated with two rod conductors for forming an electrical connection. The plurality of rod conductors is dividable into groups of rod conductors with several rod conductors each, and the plurality of interconnection pieces is dividable into groups of interconnection pieces with several interconnection pieces each, wherein one interconnection piece each of a group of interconnection pieces is provided for an electrical connection of two rod conductors from different groups of rod conductors. The interconnection pieces each have a curved shape, preferably the shape of a C, extending in the radial direction and about the axis of rotation of the stator. Furthermore, in order to form respective interconnection planes along the axis of rotation, the groups of interconnection pieces are arranged in the region of at least one longitudinal end of the rod conductors of the associated groups of rod conductors that are to be electrically connected.

The invention is based on the basic idea that a plurality of interconnection pieces and rod conductors each are dividable into groups and advantageously electrically connectable such that assembled windings are providable. With the individual groups of interconnection pieces and rod conductors, individual interconnection planes can be formed and compactly arranged.

In particular, with the arrangement of the interconnection pieces in groups of interconnection pieces along different interconnection planes, an advantageous compromise between the radial installation space and the installation space in the direction of the axis of rotation of the stator can be provided.

The stator may in particular be provided for an electric machine, i. e. a synchronous machine or an asynchronous machine.

Furthermore, rod conductors in the sense of the invention can in particular be electric conductors for forming assembled windings.

Accordingly, rod conductors can be embodied in one piece (solid wire) or in multiple pieces (wire strands), and be embodied, for example, in the form of hairpins or in an I-shape (I pins). Rod conductors can in particular also be embodied as compression moulded and twisted wire strands.

A plurality of interconnection pieces preferably means more than two interconnection pieces, in particular three interconnection pieces, four interconnection pieces, or five interconnection pieces. With the interconnection pieces or a group of interconnection pieces, a corresponding plurality of rod conductors of two different groups of rod conductors can be interconnected electrically.

In the sense of the invention, a group of interconnection pieces forms an interconnection plane which is preferably oriented orthogonally to the axis of rotation of the stator. An interconnection plane accordingly extends at a position along the axis of rotation, in particular in the regions of the longitudinal ends of the rod conductors or the front regions of the stators, in the direction orthogonal to the axis of rotation.

The front regions of the stator in particular mean the opposed longitudinal ends of the rod conductors. At the longitudinal ends or in the region along the longitudinal ends of the rod conductors, one or more interconnection planes each can be formed. Furthermore, several groups of interconnection pieces can be provided within the same interconnection plane for interconnecting different rod conductors or groups of rod conductors.

It is furthermore provided for the rod conductors of one group of rod conductors or the groups of rod conductors to be electrically connected to each other, respectively, to comprise each the same height or longitudinal extension. Thus, one group of interconnection pieces each forms one plane, i. e. an interconnection plane, along which the associated rod conductors can be connected to each other electrically by means of the interconnection pieces.

In a preferred embodiment, the interconnection pieces have a rectangular cross-section having a height and a width.

Preferably, the height and width of the interconnection pieces differ by two times the amount. Thereby, the total length of the winding, and thus its resistance, can be reduced and thus the transmission losses restricted.

Preferably, the height and width of the interconnection pieces differ by 1.5 times the amount. By the surface enlarged compared to the square cross-section, cooling can be improved.

Furthermore, the cross-section of the interconnection pieces can be reduced by between 30% and 60% compared to the optimal efficiency. Thereby, the amount of required materials can be reduced without departing from a satisfactory efficiency.

Thus, an advantageous compensation between the cooling surface, current-related transmission losses and required material can be achieved.

According to a further embodiment, the rod conductors each comprise rod conductor contact surfaces, and the interconnection pieces each comprise corresponding interconnection piece contact surfaces for providing an electrical contact, the rod conductor contact surfaces and the interconnection piece contact surfaces at least partially extending in the radial direction of the stator.

At longitudinal ends of the rod conductors, a rod conductor contact surface, and at ends of the interconnection pieces, interconnection piece contact surfaces each are formed, wherein the rod conductor contact surfaces and the interconnection piece contact surfaces are each embodied corresponding to each other, so that a preferably pretensionable surface contact can be provided.

Preferably, the corresponding contact surfaces can be embodied such that the contact surfaces abut against each other when the stator is assembled, in particular in the course of a rotary motion for pre-positioning. The at least partial extension of the contact surfaces in the radial direction can in particular be understood in the sense of, for example, wedge-shaped contact surfaces, one direction component of the wedge shape extending in the radial direction.

Thus, the interconnection pieces can be connected with the associated rod conductors in a pre-positioned state, that means preferably in a pretensioned surface contact, with a positive fit and/or a form fit and/or a material bond, in particular by means of a laser beam welding process. Preferably, this can be done in the form of a laser or electron welding process, a resistance welding process, an ultrasonic welding process, or a friction welding process or friction stir welding process.

In a preferred embodiment, the interconnection pieces of one group of interconnection pieces are interlaced, in particular interlaced in a C shape, and arranged spaced apart from each other in the radial direction. In particular, the interconnection pieces of one group of interconnection pieces can be arranged to be interlaced in the radial direction, so that a structural height of the stator is reducable in the longitudinal direction of the axis of rotation.

Thus, radially internal interconnection pieces can be gripped around by radially external interconnection pieces to permit a spatial extension of the interconnection in the radial direction and reduce the height of the installation space of the stator. By means of a distance of the interconnection pieces to each other, no separate insulation of the installation pieces is required.

According to one embodiment, the interconnection pieces extend at their longitudinal ends each in the radial direction with respect to the axis of rotation, and/or extend in a z-shape. In particular, individual interconnection pieces or end regions of interconnection pieces of one group of interconnection pieces can extend in a z-shape. By the z-shape, one contact surface is at a height axially different from that of the main portion of the interconnection piece.

In particular, in the sense of a C-shaped embodiment of the interconnection pieces, a projection of the interconnection pieces to the rod connectors in the radial direction is provided. Thus, an advantageous arrangement of the interconnection pieces for an electrical connection of two rod conductors each can be achieved.

Furthermore, by means of a z-shaped extension of one end or end region of an interconnection piece of a group of interconnection pieces, in particular a change of the interconnection plane for transmitting a voltage or a current to further interconnection planes of the stator is possible.

According to a preferred embodiment, the rod conductors of electrically separated groups of rod conductors have different longitudinal extensions, so that the respectively associated groups of interconnection pieces are arranged spaced apart from each other in the direction of the axis of rotation to form a plurality of interconnection planes.

In this way, interconnection planes can be provided which are arranged at a distance to each other as required. A compact structural shape of the stator can be achieved. Individual interconnection planes extend each in an orthogonal plane with respect to the axis of rotation of the stator.

In a further embodiment, the interconnection pieces of the groups of interconnection pieces forming one interconnection plane are arranged in an insulation disc, and/or the groups of interconnection pieces of different interconnection planes are arranged spaced apart by at least one spacer or at least one holding clamp.

At the longitudinal ends or in the front regions of the rod conductors, several insulation discs each can be provided. The individual insulation disc preferably has an annular design and comprises a plurality of interconnection pieces, one interconnection piece each being associated with two rod conductors in order to form an electrical connection.

In particular, one individual insulation disc can comprise several groups of interconnection pieces which are arranged radially distributed along the insulation disc.

The insulation disc can be embodied as a ring disc, wherein the interconnection pieces project beyond an inner diameter of the insulation disc to permit electrical contacting with the rod conductors.

By means of the insulation disc, a pre-positioning and association of the interconnection pieces with respect to the rod conductors can be provided. The association and arrangement of the interconnection pieces or groups of interconnection pieces with respect to the rod conductors or groups of rod conductors can be accomplished in a modular way.

Furthermore, the insulation discs can comprise a plurality of grooves for receiving the interconnection pieces, or the plurality of interconnection pieces is cast into the insulation discs.

According to one embodiment, in particular in order to guide out the winding phase and/or to combine the winding phases into a neutral point, a connection plane with a connection insulation disc, in particular an annular connection insulation disc, and connection pieces to provide at least two phase terminals and/or one neutral terminal is provided. In particular, phase and/or neutral terminals can be electrically connected to the connection pieces for a suitable power or voltage supply of the stator.

The connection insulation disc preferably has an annular design. In particular, the connection insulation disc is embodied comparably to the other insulation discs. Furthermore, the connection pieces can be embodied comparably to the interconnection pieces. For example, the connection pieces can be received or arranged in the connection insulation disc, so that a pre-positioning and contacting with the respective rod conductors is possible.

In one embodiment, the phase terminals and/or the neutral terminal is each embodied by means of at least one connector, in particular a block-type connector, wherein the at least one connector is connected, in particular welded, to a connection piece with a positive fit and/or a form fit and/or by a material bond.

Each connector is electrically connectable to one connection piece. In particular, the connectors can be connected to the connection pieces by laser beam welding, electron beam welding, friction welding or friction stir welding or the like.

Furthermore, one thread each can be provided at the connectors for suitably contacting the stator with a control unit, a drive converter or the like.

According to a further embodiment, a connection component is provided which can be placed onto the connectors for mechanically fixing and spacing apart the connectors with respect to each other. The connection component is preferably made of an insulating material, such as plastic.

Thus, the connectors can be suitably arranged and fixed to each other and to the stator, in particular along the connection insulation disc in the provided connection plane.

In an independent aspect of the invention, a connecting component for a stator according to the present invention is provided, wherein the connection component comprises at least one material recess for receiving at least one connector, so that the connector is mechanically fixable within the material recess.

In particular if several connectors are used, thus a purposeful positioning and spacing among each other can be provided with the connection component.

In a further independent aspect of the invention, an electric machine with a stator and/or a connection component according to the present invention is provided.

Below, the invention will be illustrated in detail with respect to the enclosed drawings with reference to several exemplified embodiments.

Figure 2:
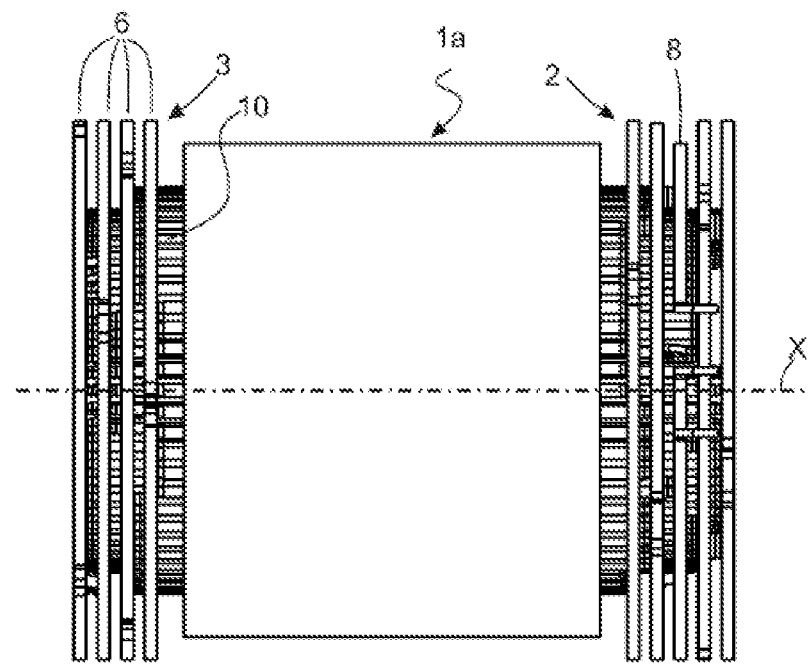
Figure 3:
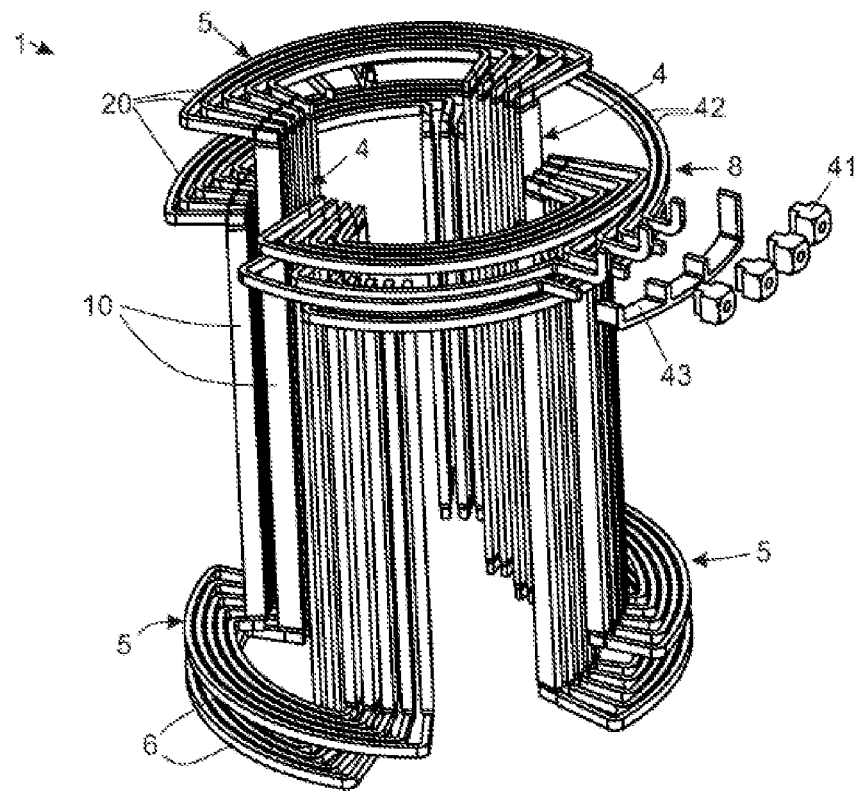
Figure 4:
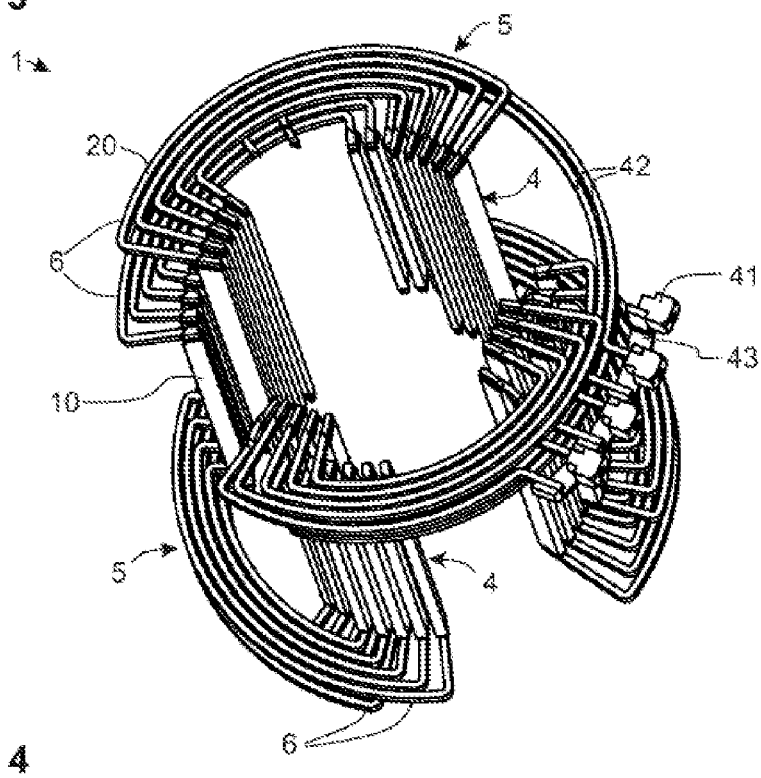
Figure 6:
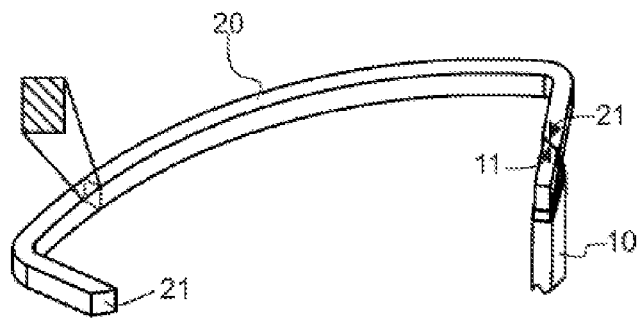
Figure 7:
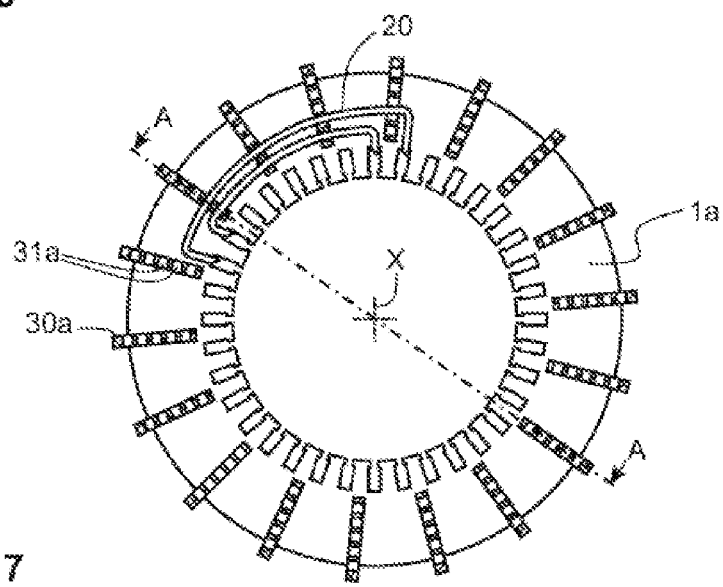
Figure 8:
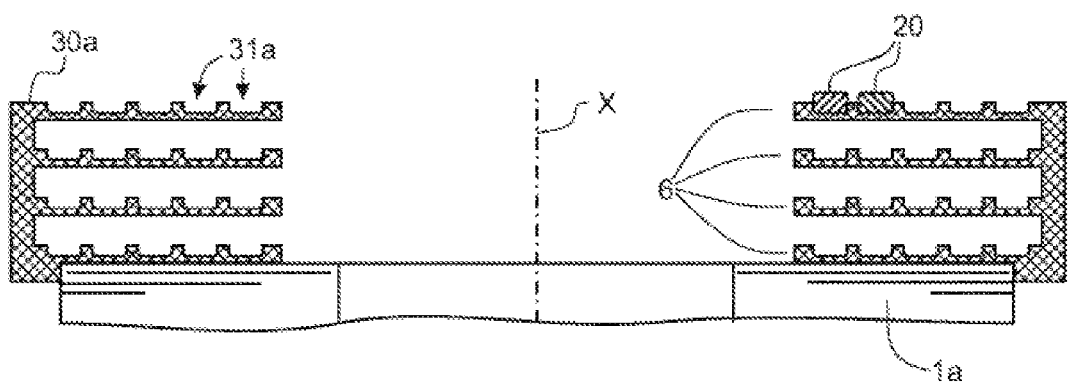
Figure 9:
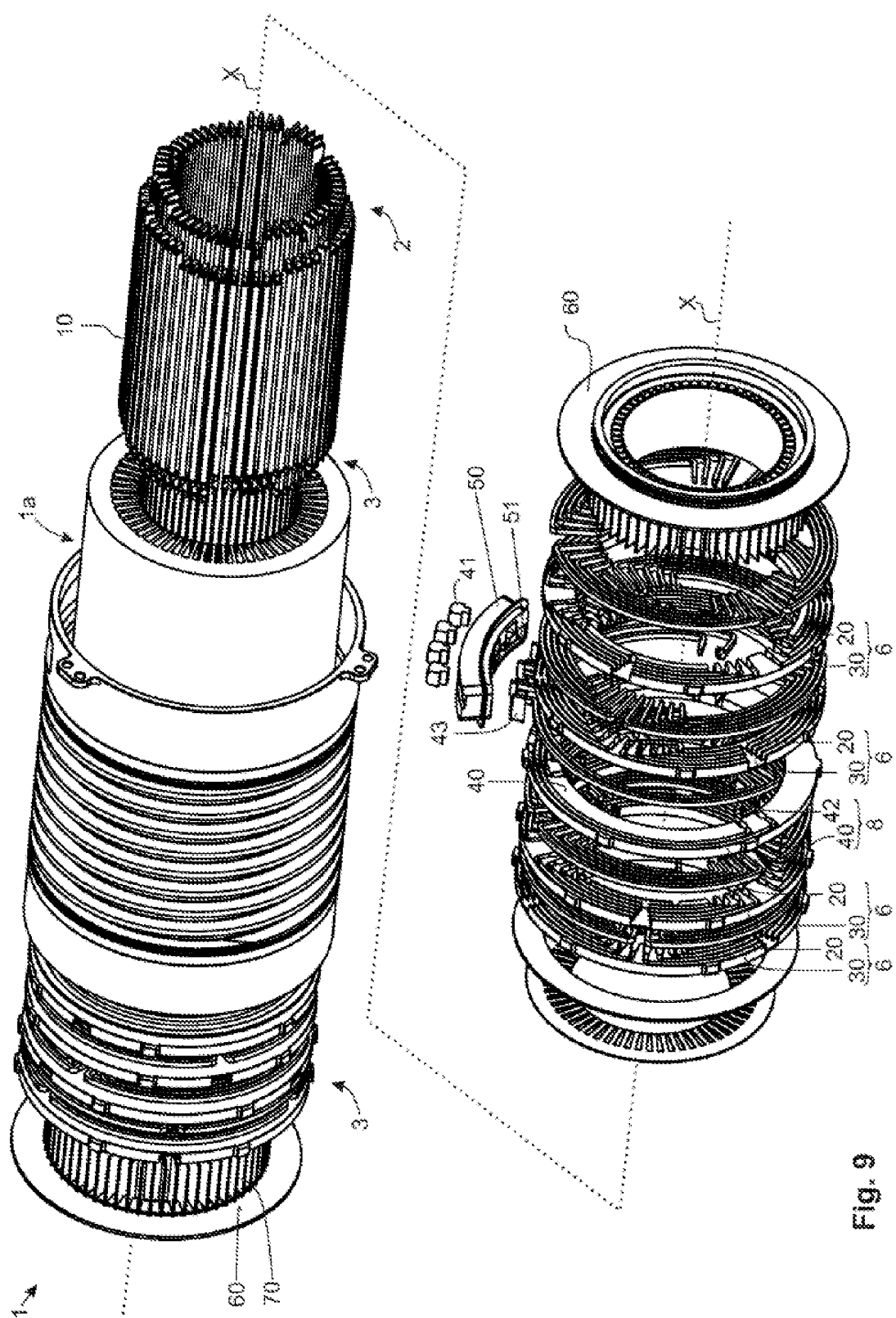
Figure 10:
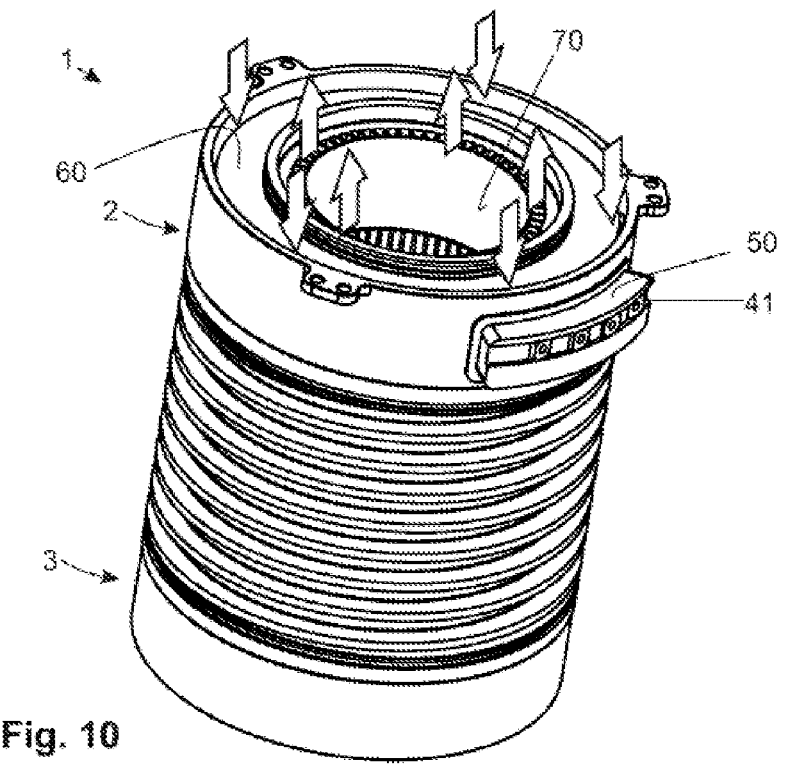
Figure 11:
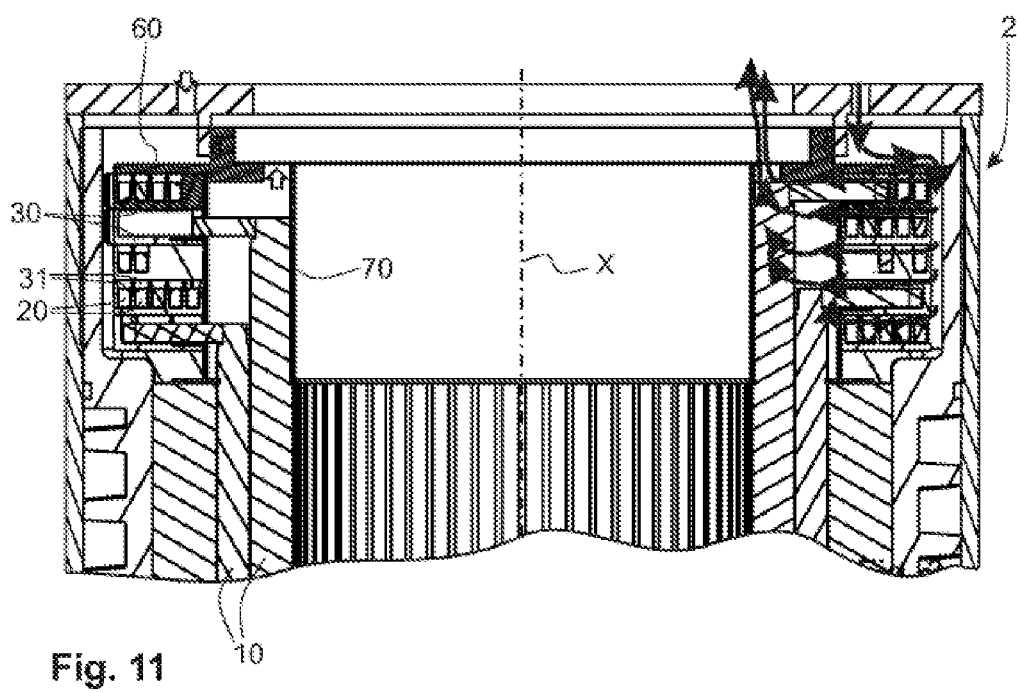

The drawings schematically show:

FIG. 1 a perspective representation of the assembled windings of a stator according to the invention;

FIG. 2 a side view of a stator core stack;

FIG. 3 a perspective view of a winding phase with a neutral and a phase terminal;

FIG. 4 a further perspective view of a winding phase with a neutral and a phase terminal;

FIG. 5a-e various interconnection planes or one connection plane of a front region of the stator;

FIG. 6 a representation of the connection between the rod conductor and the interconnection piece;

FIG. 7 a plan view onto a fixing possibility of the interconnection pieces by means of holding clamps;

FIG. 8 a cross-sectional view of the fixing possibility of the interconnection pieces according to FIG. 8;

FIG. 9 a perspective exploded view of a stator according to the invention;

FIG. 10 a perspective representation of fluid inlets and fluid outlets for a cooling fluid flow of a stator; and FIG. 11 a representation of a cooling fluid flow within the stator in a cross-sectional view.

Figure 12:
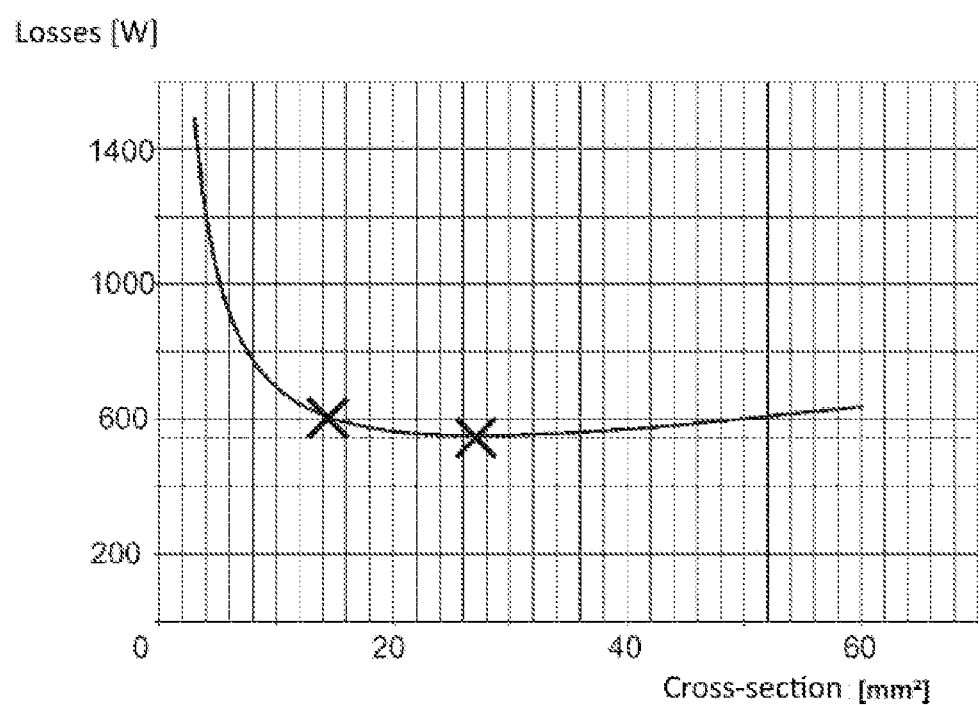

FIG. 12 a graphical representation of the copper losses in response to a cross-sectional shape of the interconnection pieces;

FIG. 13 a tabular representation of the copper losses in response to a cross-sectional shape of the interconnection pieces.

FIG. 1 shows a perspective representation of the assembled windings of a stator 1.

The stator 1 is embodied with radially distributed and spaced-apart rod conductors 10 which extend in the longitudinal direction of the axis of rotation X. Longitudinal ends of the rod conductors 10 represent opposed front regions 2; 3 of the stator 1 or form them.

In the front regions of the stator 2; 3 or at the longitudinal ends of the rod conductors 10, several arrangements of interconnection pieces 20 each are provided. Thus, the interconnection pieces 20 embody different interconnection planes 6 to achieve a suitable interconnection of the rod conductors 10 to provide assembled windings.

The interconnection pieces 20 extend, according to FIG. 1, in a curved shape and extend, in particular at their end regions, each in the radial direction to provide a contact with respectively associated rod elements 10.

According to FIG. 1, one can see that individual interconnection pieces 20 are divided into groups of interconnection pieces 5. Radially internal interconnection pieces 20 are gripped around by radially external interconnection pieces 20.

At the upper front region 2, between the individual interconnection planes 6, a connection plane 8 with phase terminals for power and voltage supply is furthermore provided, in particular to guide out the winding phase and/or to combine the winding phases into a neutral point.

In FIG. 2, a side view of a stator core stack 1a with the assembled winding represented in FIG. 1 is shown.

It can in particular be seen in FIG. 2 that the different interconnection planes 6 at the front sides 2; 3 of the stator 1 or the stator core stack 1a are spaced apart in the longitudinal direction of an axis of rotation X.

The interconnection planes 6 are each formed by the interconnection pieces 20 or groups 5 of interconnection pieces.

Furthermore, at one front side 2 of the stator core stack 1a, the connection plane 8 is formed.

In FIGS. 3 and 4, perspective views of a winding phase with one neutral and three phase terminals is represented.

In particular, the division of the interconnection pieces 20 into groups 5 of interconnection pieces for a suited electrical connection of the rod conductors 10, divided into groups of rod conductors 4, is represented.

Thus, the rod conductors 10 or groups 4 of rod conductors for providing assembled windings with the interconnection pieces 20 or groups 5 of interconnection pieces are suitably connectable. With the groups 5 of interconnection pieces, individual interconnection planes 6 are formed which each extend in a region along the axis of rotation or along a front-side longitudinal end of the respectively associated rod conductors 10 or group 4 of rod conductors.

Furthermore, in FIGS. 3 and 4, the formation of the connection plane 8 with the connection pieces 42 and the connectors 41 is represented. The stator has three phase terminals for three voltage phases and one neutral terminal which are each connected with a connector 41. Thus, power or voltage can be suitably applied to the stator 1 via the connectors 41.

Furthermore, a neutral connector 43 is shown which electrically connects the individual phase terminals and the neutral terminal with each other. The three phases are interconnected in a star connection. Via the star connection, the windings of the stator can be utilised, for example, as inductances of a direct current step-up switching regulator for adapting a voltage level for charging a battery.

In FIGS. 5a-e, different interconnection planes 6 or the connection plane 8 of one of the front regions 2; 3 of the stator 1 are represented.

According to FIGS. 5a, 5b, 5d and 5e, in the interconnection planes 6, three groups 5 of interconnection pieces arranged radially distributed each with four to five interconnection pieces 20 are provided.

Figure 5:
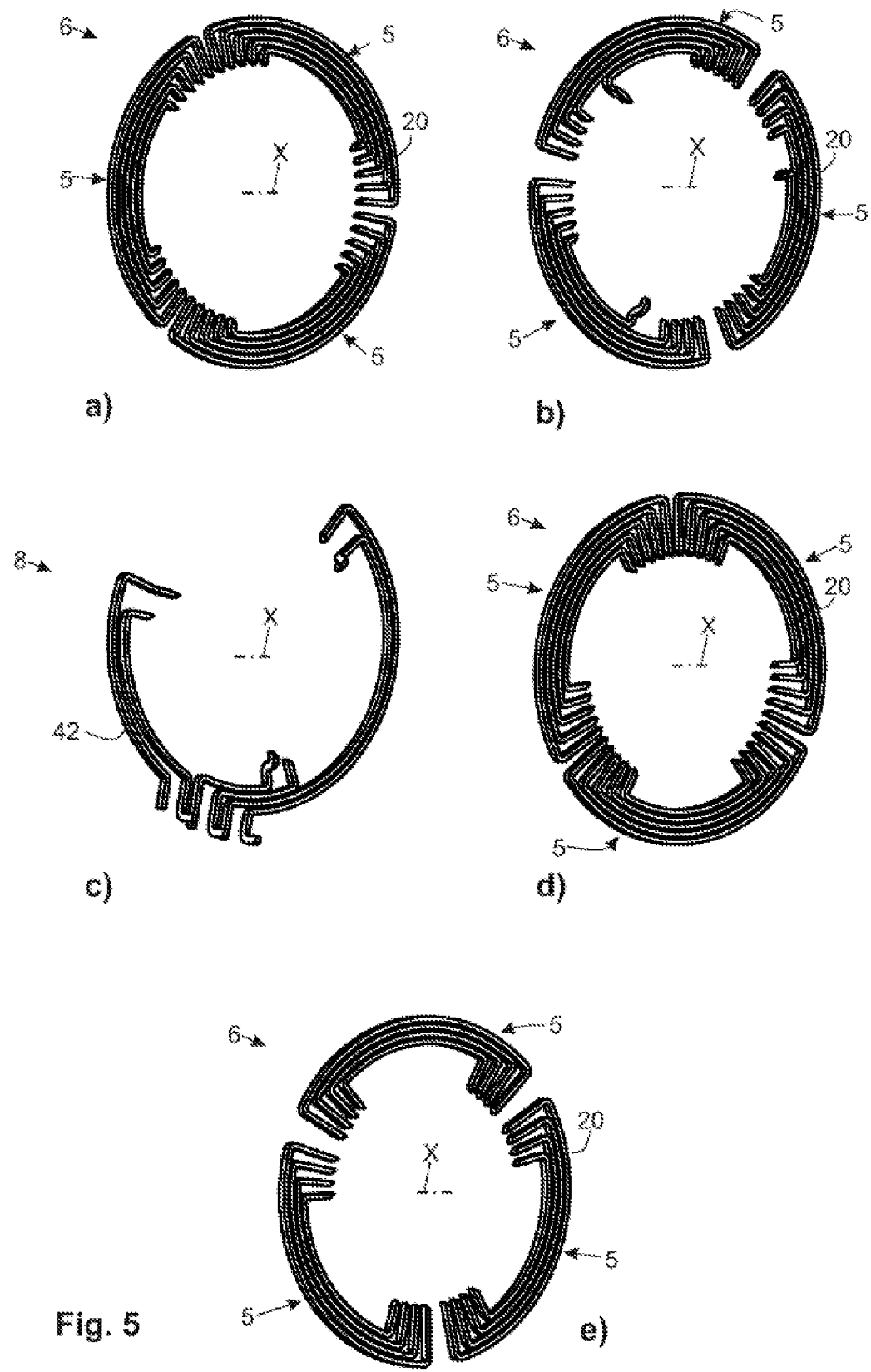

Furthermore, according to FIG. 5b, individual interconnection pieces 20 can have a z-shaped extension at one longitudinal end, in particular to change the interconnection plane 6 or to transmit voltage or power to an adjacently arranged interconnection plane 6.

In FIG. 5c, moreover the connection plane 8 with connection pieces 42 is represented. The connection pieces 42 can be embodied comparably with the interconnection pieces 20. Furthermore, the connection pieces 42 can comprise angled end regions for a suitable connection with connectors 41.

FIG. 6 shows a representation of the connection between the rod conductor 10 and the interconnection piece 20.

The interconnection piece 20 has a rectangular cross-sectional shape with a height and a width.

At the end regions, the interconnection piece 20 each has an interconnection piece contact surface 21 which at least partially extends in the radial direction. The interconnection piece contact surface 21 is located parallel to the axis of rotation X. The end regions of the interconnection piece are correspondingly formed in a wedge shape.

The rod conductor 10 has, at its longitudinal end, a corresponding rod conductor contact surface 11. The rod conductor contact surface 11 at least partially extends in the radial direction. The rod conductor contact surface 21 is located parallel to the axis of rotation X. The cross-section of the longitudinal end of the rod conductor 10 correspondingly has a wedge shape.

Thus, a contacting of the rod conductor 10 with the interconnection piece 20 can be ensured in the course of a pre-positioning and subsequent rotation. Preferably, a pre-tensioned surface contact between the rod conductor 10 and the interconnection piece 20 is providable.

In FIGS. 7 and 8, a fixing possibility of the interconnection pieces is shown, in a plan view and a cross-sectional view, respectively. In FIG. 7, a plan view onto a fixing possibility of interconnection pieces 20 by means of holding clamps 30a is shown. According to FIG. 7, holding clamps 30a are provided in grooves 31a at the circumference of the stator to receive and position the interconnection pieces 20. The holding clamps 30a are to this end arranged uniformly distributed in the circumferential direction on the stator core stack 1a.

In FIG. 8, a cross-sectional view along section A-A of FIG. 7 is shown. According to FIG. 8, it is obvious that interconnection pieces 20 are inserted in the holding clamp 30a. The holding clamps 30a are arranged on the stator core pack 1a. The holding clamps are here integrally formed to receive the interconnection pieces of several planes. However, a multi-piece design of the holding clamps 30a, in particular with a separation according to the individual interconnection planes 6, is also conceivable.

FIG. 9 shows a perspective exploded view of a stator 1 according to the invention with a further fixing possibility of the interconnection pieces. Accordingly, the components of the stator 1 are concentrically arranged along the axis of rotation X.

The stator 1 is embodied with the radially distributed and spaced-apart rod conductors 10 which extend in the longitudinal direction of the axis of rotation X. Longitudinal ends of the rod conductors 10 represent the opposed front regions 2; 3 of the stator 1 or of the stator core stack 1a.

Furthermore, the stator 1 has several insulation discs 30 with several interconnection pieces 20 each.

At the front regions 2; 3 of the stator 1, one annular cover part 60 is arranged each. The cover parts 60 represent an enclosure of the insulation discs 30 and thus the terminals of the stator 1 on both sides.

The cover parts 60 each have disconnection pieces which may in particular extend in the longitudinal direction of the axis of rotation X between the rod conductors 10 or the interconnection pieces 20, in particular for the respective spacing or insulation (insulation star 70).

Furthermore, the connection component 50 is provided with material recesses 51 for receiving the connectors 41 in the connection plane 8. Thus, the connection pieces 42, which are arranged and received in a connection insulation disc 40, can be suitably fed with power or voltage via the connectors 41.

FIG. 10 shows a perspective representation of fluid inlets and fluid outlets for a cooling fluid flow of a stator 1.

It can in particular be provided that a cooling fluid can enter or exit at the front regions 2; 3 of the stator 1 (cf. arrow directions in FIG. 10). Preferably, the winding overhang or the assembled windings of the stator 1 can be directly cooled with the cooling fluid. Furthermore, the insulation discs 30 can be embodied to allow a cooling fluid to flow therethrough.

FIG. 11 shows a representation of a cooling fluid flow within the stator 1 in a cross-sectional view.

At the front region 2 of the stator 1, a cooling fluid can flow into the stator 1 and reach the insulation discs 30 through the cover part 60 (cf. arrow directions in FIG. 11). Furthermore, the cooling fluid can flow through the insulation discs 30 to cool the individual interconnection pieces 20 in the grooves 31 of the insulation discs 30.

FIGS. 12 and 13 show a graphic or tabular representation of the transmission losses, which may also be referred to as copper losses, in response to a cross-sectional shape of the interconnection pieces. The width of the interconnection pieces is assumed as constant. The copper losses result from the total resistance of the winding, multiplied by the square of the current. The resistance of each winding phase results from the series connection of the rod conductors and interconnection pieces of one phase. The resistances are also temperature-dependent, where for the material copper, an approximate temperature coefficient of 0.0039/K may be selected. For the other factors, corresponding literature values apply. The resistance results from the specific resistance multiplied by the length of a conductor divided by its cross-section. The specific resistances of the rod conductors and the current are given. Such a model can be easily established so that the establishment of the model is not discussed in greater detail here.

The basis of the example of FIGS. 12 and 13 is the stator winding of FIG. 1 with altogether 120 rod conductors each having a mean length of about 22 cm. The total length of the winding including the interconnection pieces thus is within a size in the order of 12 m. The width of the interconnection pieces is assumed as constant with 3 mm. The nominal current is assumed as 220 A. If for the given example, a loss-optimal cross-section is to be selected, this would be about 27 mm$^2$ or edge lengths of 3 mm to 9 mm. If the edge lengths become higher, this extends the height of the winding overhang, so that the individual rod conductors have to have a longer length, so that the overall resistance and thus the transmission losses increase. If the height of the interconnection pieces is reduced, the winding overhang will become shorter, so that the rod conductors can have a shorter average length. This reduces the electric resistance. Simultaneously, the current-carrying cross-section of the interconnection pieces is reduced, so that the overall resistance will increase effectively. The efficiency losses, however, are to be considered as slight with a reduction of the cross-sectional areas of not more than about 30 to 60% as compared to the cross-section leading to an optimal efficiency. Thus, in response to the provided cooling, in particular in case of oil cooling, an advantageous cross-section of for example 3 to 5 or 15 mm$^2$ can be selected.

In FIG. 12, the loss optimum for a cold stator at 20° C. is plotted with 551 W, cf. FIG. 13, as a cross. Furthermore, the loss state with an optimized interconnection piece cross-section is plotted with 599 W, cf. FIG. 13.

The statements apply both to the losses for a stator in a cold state, that means at a temperature of 20° C., and for a stator in a warm state, i. e. at a temperature of about 155° C. As a summary, by means of the present invention, a stator 1 with assembled windings can be provided which can be manufactured in a simple manner and simultaneously has a reduced installation space.

In particular, an advantageous interconnection of the rod conductors 10 along individual interconnection planes 6 can be effected purposefully and in a space-saving manner.

Furthermore, in form of the connection plane 8, there is a possibility of centrically applying power or voltage to the stator 1, in particular to guide out the winding phase and/or to combine the winding phases into a neutral point. Moreover, an advantageous temperature control is available, in particular by means of insulation discs 30 through which a cooling fluid can flow.

The stator is in particular suited for a traction motor of an electrically driven vehicle.

LIST OF REFERENCE NUMERALS 1 stator
1a stator core stack
2 front region of the stator
3 front region of the stator
4 group of rod conductors
5 group of interconnection pieces
6 interconnection plane
8 connection plane
10 rod conductor
11 rod conductor contact surface
20 interconnection piece
21 interconnection piece contact surface
30 insulation disc
30a holding clamp/spacer
31 groove
31a groove
40 connection insulation disc
41 connector
42 connection pieces
43 star connector
50 connection component
51 material recess
60 cover part
70 insulation star
X axis of rotation

The invention claimed is:

1. Stator for an electric machine, comprising a plurality of rod conductors arranged radially distributed about an axis of rotation of the stator and each spaced apart from each other, so that the rod conductors extend in the longitudinal direction of the axis of rotation,
and with a plurality of interconnection pieces, so that one interconnection piece each is associated with two rod conductors to form an electrical connection,
wherein the plurality of rod conductors is dividable into groups of rod conductors with several rod conductors each, and the plurality of interconnection pieces is dividable into groups of interconnection pieces with several interconnection pieces each,
wherein the interconnection pieces of one group of interconnection pieces are provided for an electrical connection of two rod conductors from different groups of rod conductors,
wherein the interconnection pieces each have a curved embodiment extending in the radial direction and about the axis of rotation of the stator, wherein, in order to form respective interconnection planes along the axis of rotation, each group of interconnection pieces is arranged in the region of one longitudinal end of the rod conductors of the associated group of rod conductors that are to be electrically connected,
wherein the interconnection pieces of one group of interconnection pieces are interlaced and arranged spaced apart in the radial direction, characterized in that the interconnection pieces extend at their longitudinal ends each in the radial direction with respect to the axis of rotation in a z-shape, such that by the z-shape, one contact surface is at a height axially different from that of the main portion of the interconnection piece and a change of the interconnection plane for transmitting a voltage or a current to further interconnection planes of the stator is possible.

2. Stator according to claim 1, wherein the interconnection pieces comprise a rectangular cross-section with a height and width, wherein the height and width preferably differ at most by twice the amount.

3. Stator according to claim 2, wherein the rod conductors each comprise rod conductor contact surfaces and the interconnection pieces each corresponding interconnection piece contact surfaces in order to provide an electrical contact, wherein the rod conductor contact surfaces and the interconnection piece contact surfaces at least partially extend in the radial direction of the stator.

4. Stator according to claim 3, wherein rod conductors of electrically separated groups of rod conductors comprise different longitudinal extensions, so that the respective associated groups of interconnection pieces are arranged spaced apart in the direction of the axis of rotation in order to form several interconnection planes.

5. Stator according to claim 1, wherein the rod conductors each comprise rod conductor contact surfaces and the interconnection pieces each corresponding interconnection piece contact surfaces in order to provide an electrical contact, wherein the rod conductor contact surfaces and the interconnection piece contact surfaces at least partially extend in the radial direction of the stator.

6. Stator according to claim 1, wherein rod conductors of electrically separated groups of rod conductors comprise different longitudinal extensions, so that the respective associated groups of interconnection pieces are arranged spaced apart in the direction of the axis of rotation in order to form several interconnection planes.

7. Stator according to claim 1, wherein the interconnection pieces of the groups of interconnection pieces forming an interconnection plane are arranged in one insulation disc, and/or the groups of interconnection pieces of different interconnection planes are arranged spaced apart by at least one spacer or at least one holding clamp.

8. Stator according to claim 1, wherein a connection plane with a connection insulation disc, and connection pieces is provided in order to provide at least two phase connections or one neutral terminal.

9. Stator according to claim 8, wherein the phase terminals and/or the neutral terminal are each embodied by means of at least one connector, wherein the at least one connector is connected to a connection piece with a positive fit, a form fit, or by a material bond.

10. Stator according to claim 9, wherein a connection component is configured to be placed onto the connectors to mechanically fix and space apart the connectors with respect to each other.

11. Connection component for a stator according to claim 10, wherein the connection component comprises at least one material recess for receiving at least one connector, so that the connector is mechanically fixable within the material recess.

12. Stator according to claim 9, wherein the at least one connector is a block-type connector.

13. Stator according to claim 9, wherein the at least one connector is welded to a connection piece with a positive fit, a form fit, or by a material bond.

14. Stator according to claim 8, wherein the connection insulation disc is an annular connection insulation disc.

15. Electric machine with a stator according to claim 1.

16. Stator according to claim 1, wherein the interconnection pieces each have a shape of C.

* * * * *